US012685239B2

(12) United States Patent
    Barrick

(10) Patent No.: US 12,685,239 B2
(45) Date of Patent: Jul. 21, 2026

(54) SYSTEM AND METHOD FOR DETECTING TRIPPING AND/OR FLOATING EVENTS OF GROUND-ENGAGING SHANKS ON AN AGRICULTURAL IMPLEMENT

(71) Applicant: CNH Industrial America LLC, New Holland, PA (US)

(72) Inventor: Christopher Barrick, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 796 days.

(21) Appl. No.: 18/071,267

(22) Filed: Nov. 29, 2022

(65) Prior Publication Data

US 2024/0172575 A1     May 30, 2024

(51) Int. Cl.
    *A01B 61/04*        (2006.01)
    *A01B 35/24*        (2006.01)
    *A01B 76/00*        (2006.01)

(52) U.S. Cl.
    CPC ............ *A01B 61/044* (2013.01); *A01B 35/24* (2013.01); *A01B 76/00* (2013.01)

(58) Field of Classification Search
    CPC ........ A01B 61/044; A01B 35/24; A01B 76/00
    See application file for complete search history.

(56) References Cited

U.S. PATENT DOCUMENTS

| | | | | |
|---|---|---|---|---|
| 9,462,744 | B2 * | 10/2016 | Isaacson | ................ A01C 7/205 |
| 9,826,677 | B2 * | 11/2017 | Gervais | .................. A01C 7/205 |
| 10,561,056 | B2 | 2/2020 | Peterson et al. | |
| 11,259,454 | B2 * | 3/2022 | Kovach | ................... A01B 76/00 |
| 11,419,254 | B2 * | 8/2022 | Barrick | ................. A01B 63/111 |
| 11,707,010 | B2 * | 7/2023 | Harmon | ............... A01B 63/112 |
| | | | | 701/50 |
| 2013/0192186 | A1 * | 8/2013 | Bassett | .................. A01C 7/006 |
| | | | | 56/10.2 E |
| 2017/0196160 | A1 * | 7/2017 | Bjerketvedt | ........... A01B 15/02 |
| 2018/0310466 | A1 * | 11/2018 | Kovach | ..................... G01D 5/12 |
| 2019/0107138 | A1 * | 4/2019 | Brown | ...................... G01L 5/24 |
| 2020/0390023 | A1 * | 12/2020 | Harmon | .............. A01B 63/002 |
| 2021/0059098 | A1 * | 3/2021 | Kovach | .................. A01B 35/24 |
| 2021/0102984 | A1 * | 4/2021 | Stanhope | ............. A01B 61/042 |
| 2021/0120726 | A1 * | 4/2021 | Barrick | .................... A01B 3/00 |
| 2021/0134090 | A1 * | 5/2021 | Sporrer | ............... A01B 61/046 |
| 2022/0304212 | A1 | 9/2022 | Glovier et al. | |

OTHER PUBLICATIONS

U.S. Appl. No. 17/533,464, filed Nov. 23, 2021.

* cited by examiner

*Primary Examiner* — Jamie L McGowan
(74) *Attorney, Agent, or Firm* — Dority & Manning, P.A.

(57) ABSTRACT

An agricultural implement includes a shank assembly having a ground-engaging shank. Furthermore, the shank assembly includes a biasing element coupled to a frame of the agricultural implement via a first pivot joint and coupled to the ground-engaging shank via a second pivot joint. Additionally, the agricultural implement includes a load sensor(s) configured to generate data indicative of the load(s) being applied to the first and second pivot joints by the biasing element. In addition, the agricultural implement includes a computing system configured to determine when the ground-engaging shank is tripping or floating based on the data generated by the load sensor(s).

20 Claims, 5 Drawing Sheets

SYSTEM AND METHOD FOR DETECTING TRIPPING AND/OR FLOATING EVENTS OF GROUND-ENGAGING SHANKS ON AN AGRICULTURAL IMPLEMENT

FIELD OF THE INVENTION

The present disclosure generally relates to agricultural implements and, more particularly, to a system and a method for detecting tripping and/or floating of ground-engaging shanks on an agricultural implement.

BACKGROUND OF THE INVENTION

It is well known that, to attain the best agricultural performance from a piece of land, a farmer must cultivate the soil, typically through a tillage operation. Common tillage operations include plowing, harrowing, and sub-soiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

A tillage implement generally includes a plurality of ground-engaging tools supported on its frame that are configured to penetrate the soil to a particular depth. In this respect, during tillage operations, the ground-engaging tools are pulled through the soil to fracture any subsurface soil compaction layers and/or improve soil tilth. For example, in some configurations, the tillage implement includes a plurality of ground-engaging shanks. These shanks may be pivotably coupled to the frame. Tillage implements may also include biasing elements, such as springs or hydraulic cylinders configured to exert biasing forces on the ground-engaging tools. This configuration allows the ground-engaging tools to maintain the particular depth of soil penetration as the agricultural work vehicle pulls the tillage implement through the field. Additionally, this configuration also permits the ground-engaging tools to pivot out of the way of rocks or other impediments in the soil, thereby preventing damage to the ground-engaging tools or other components on the implement. This is known as tripping.

Additionally, in some instances, firm or compacted soil in certain portions of the field may exert a great enough force on the ground-engaging tools to overcome the biasing force of the biasing element. In this respect, the ground-engaging tools may pivot relative to the implement frame over an extended period of time such that the depth of soil penetration decreases. This is known as floating.

Floating and/or frequent tripping may, in turn, negatively impact the quality of the tillage operation being performed or may increase the time it takes to perform a tillage operation. Unfortunately, it can be difficult for an operator to notice when a shank is experiencing tripping and/or floating during a tillage operation as the frame and/or the wheels of the tillage implement and/or the associated work vehicle may block the operator's view of the shanks.

Accordingly, a system and method for detecting tripping and/or floating of ground-engaging shanks on an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement. The agricultural implement includes a frame. Furthermore, the agricultural implement includes a ground-engaging shank pivotably coupled to the frame. Additionally, the agricultural implement includes a biasing element coupled to the frame via a first pivot joint and to the ground-engaging shank via a second pivot joint. The biasing element is configured to bias the ground-engaging shank to a predetermined tool position relative to the frame. Moreover, the agricultural implement includes a load sensor in operative association with one of the first pivot joint or the second pivot joint. The load sensor is configured to generate data indicative of a load being applied to the one of the first pivot joint or the second pivot joint by the ground-engaging shank assembly supported on the frame, with the shank assembly including an attachment section and a ground-engaging shank pivotably coupled to the attachment section. Furthermore, the agricultural implement includes a computing system communicatively coupled to the load sensor. The computing system is configured to determine the load being applied to the one of the first pivot joint or the second pivot joint based on the data generated by the load sensor. The computing system is also configured to determine when the ground-engaging shank is experiencing at least one of tripping and/or floating based on the determined load.

In another aspect, the present subject matter is directed to a system for detecting tripping and/or floating of ground-engaging shanks on an agricultural implement. The system includes a ground-engaging shank pivotably coupled to a frame of ground-engaging shanks on an agricultural implement. Furthermore, the system includes a biasing element coupled to the frame via a first pivot and to the ground-engaging shank via a second pivot joint. The biasing element is configured to bias the ground-engaging shank to a predetermined tool position relative to the frame. Additionally, the system includes a load sensor in operative association with one of the first pivot joint or the second pivot joint. The load sensor is configured to generate data indicative of a load being applied to the one of the first pivot joint or the second pivot joint by the ground-engaging shank. Moreover, the system includes a computing system communicatively coupled to the load sensor. The computing system is configured to determine the load being applied to the one of the first pivot joint or the second pivot joint based on the data generated by the load sensor. The computing system is also configured to determine when the ground-engaging shank is experiencing at least one of tripping and/or floating based on the determined load.

In a further aspect, the present subject matter is directed to a method for detecting tripping and/or floating of ground-engaging shanks on an agricultural implement. The agricultural implement, in turn, includes a frame, a ground-engaging shank pivotably coupled to the frame, and a biasing element coupled to the frame via a first pivot joint and to the ground-engaging shank via a second pivot joint. Furthermore, the method includes receiving, with a computing system, load sensor data indicative of a load being applied to one of the first pivot joint or the second pivot joint by the ground-engaging shank. Additionally, the method includes determining, with the computing system, when the ground-engaging shank is experiencing tripping and/or floating based on the received load sensor data. Moreover, the method includes initiating, with the computing system, a control action when it is determined that the ground-engaging shank is experiencing tripping and/or floating.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
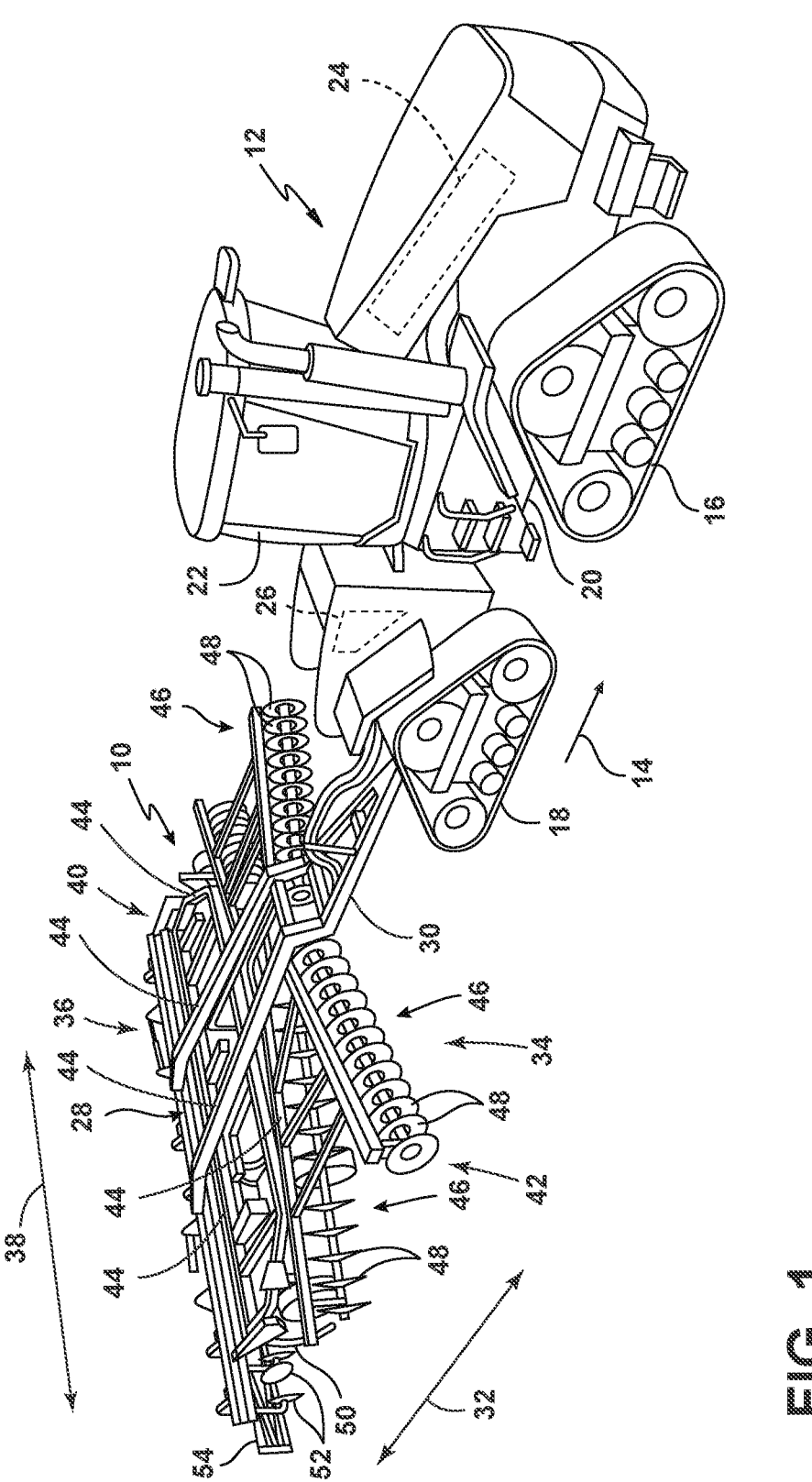
FIG. 1 illustrates a perspective view of one embodiment of an agricultural implement and an associated work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for detecting tripping and/or floating of ground-engaging shanks on an agricultural implement. As will be described below, the agricultural implement includes a frame and a ground-engaging shank pivotably coupled to the frame. Furthermore, the agricultural implement includes a biasing element coupled to the frame via a first pivot joint and to the ground-engaging shank via a second pivot joint. The biasing element, in turn, is configured to bias the ground-engaging shank to a predetermined tool position relative to the frame.

In several embodiments, a computing system of the disclosed system is configured to determine when the ground-engaging shank is tripping and/or floating. More specifically, the computing system is configured to receive load sensor data generated by a load sensor(s) in operative association with the first and/or second pivot joint. As such, the received load sensor data is indicative of the load being applied to the first and/or second pivot joint by the ground-engaging shank. Additionally, the computing system is configured to determine the load(s) being applied to the first pivot joint and/or the second pivot joint based on the received load sensor data. Thereafter, the computing system is configured to determined when the ground-engaging shank is tripping and/or floating based on the determined load(s). For example, in some embodiments, the computing system may compare the determined load(s) to a threshold load value. When the load(s) exceeds the threshold load value, the computing system may then identify the time period across which the determined load(s) exceeds the threshold load value. When the identified time period is less than a threshold time period, the computing system may determine that the ground-engaging shank is tripping. Conversely, when the identified time period is greater than the threshold time period, the computing system may determine that the ground-engaging shank is floating.

Determining when the ground-engaging shanks of an agricultural implement are tripping and/or floating based on the load(s) applied to the first pivot joint coupling the biasing element to the frame and/or the second pivot joint coupling the biasing element to the ground-engaging shank improves the operation of the agricultural implement. More specifically, during normal, non-tripped and non-floating operation of a ground-engaging shank, the loads applied to the first and second pivot joints remains below the threshold load value. However, when a ground-engaging shank trips or floats, the loads applied to the first and second pivot joints exceeds the threshold load value. As such, by monitoring the load(s) being applied to the first pivot joint coupling the biasing element of an agricultural implement to its frame and/or the second pivot joint coupling the biasing element of an agricultural implement to the ground-engaging shank, the disclosed system and method can automatically determine when the ground-engaging shanks of the implement are experiencing tripping and/or floating. Thus, the disclosed system and method can, in some embodiments, notify the operator and/or initiate other control actions (e.g., reducing ground speed or reducing the depth of tillage) immediately upon detection of tripping or floating of ground-engaging tools and without the need for the operator to notice such events, thereby improving the quality of the operation being performed by the agricultural implement.

Referring now to the drawings, FIG. 1 illustrates a perspective view of one embodiment of an agricultural implement 10 and an associated work vehicle 12 in accordance with aspects of the present subject matter. In general, the agricultural implement 10 is configured to be towed across a field by the work vehicle 12 in a direction of travel (indicated by arrow 14). For example, in one embodiment, the agricultural implement 10 is configured as a tillage implement (e.g., a disk ripper) and the work vehicle 12 is configured as an agricultural tractor. However, in other embodiments, the agricultural implement 10 may be configured as any other suitable agricultural implement, such as another type of tillage implement, a seeder, planter, nutrient applicator, etc. Similarly, the work vehicle 12 may be configured as any other suitable work vehicle, such as an agricultural harvester, a self-propelled sprayer, etc.

As shown, the work vehicle 12 includes a pair of front track assemblies 16, a pair of rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 12 and/or one or more components of the agricultural implement 10. Furthermore, the work vehicle 12 includes an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, the agricultural implement 10 includes a frame 28 configured to be towed by the work vehicle 12 via a pull hitch or tow bar 30 in the direction of travel (indicated by arrow 14). As shown, the frame 28 extends in a longitudinal direction 32 between a forward end 34 of the frame 28 and an aft end 36 of the frame 28. The frame 28 also extends in a lateral direction 38 between a first side 40 of the frame 28 and a second side 42 of the frame 28. In general, the frame 28 may include a plurality of structural frame members 44, such as beams, bars, and/or the like, configured to support or couple to a plurality of components.

Moreover, the frame 28 may be configured to support a plurality of ground-engaging and/or ground-penetrating tools, such as a plurality of shank assemblies, disk blades, leveling blades, basket assemblies, tines, spikes, and/or the like. In one embodiment, the various ground-engaging and/or ground-penetrating tools may be configured to perform a tillage operation or any other suitable ground-engaging operation on the field across which the agricultural implement 10 is being towed. For example, in the illustrated embodiment, the frame 28 is configured to support various gangs 46 of disk blades 48, a plurality of shank assemblies 50, a plurality of leveling blades 52, and a plurality of crumbler wheels or basket assemblies 54. However, in alternative embodiments, the frame 28 may be configured to support any other suitable ground-engaging tool(s), ground-penetrating tool(s), or combinations of such tools.

Figure 2:
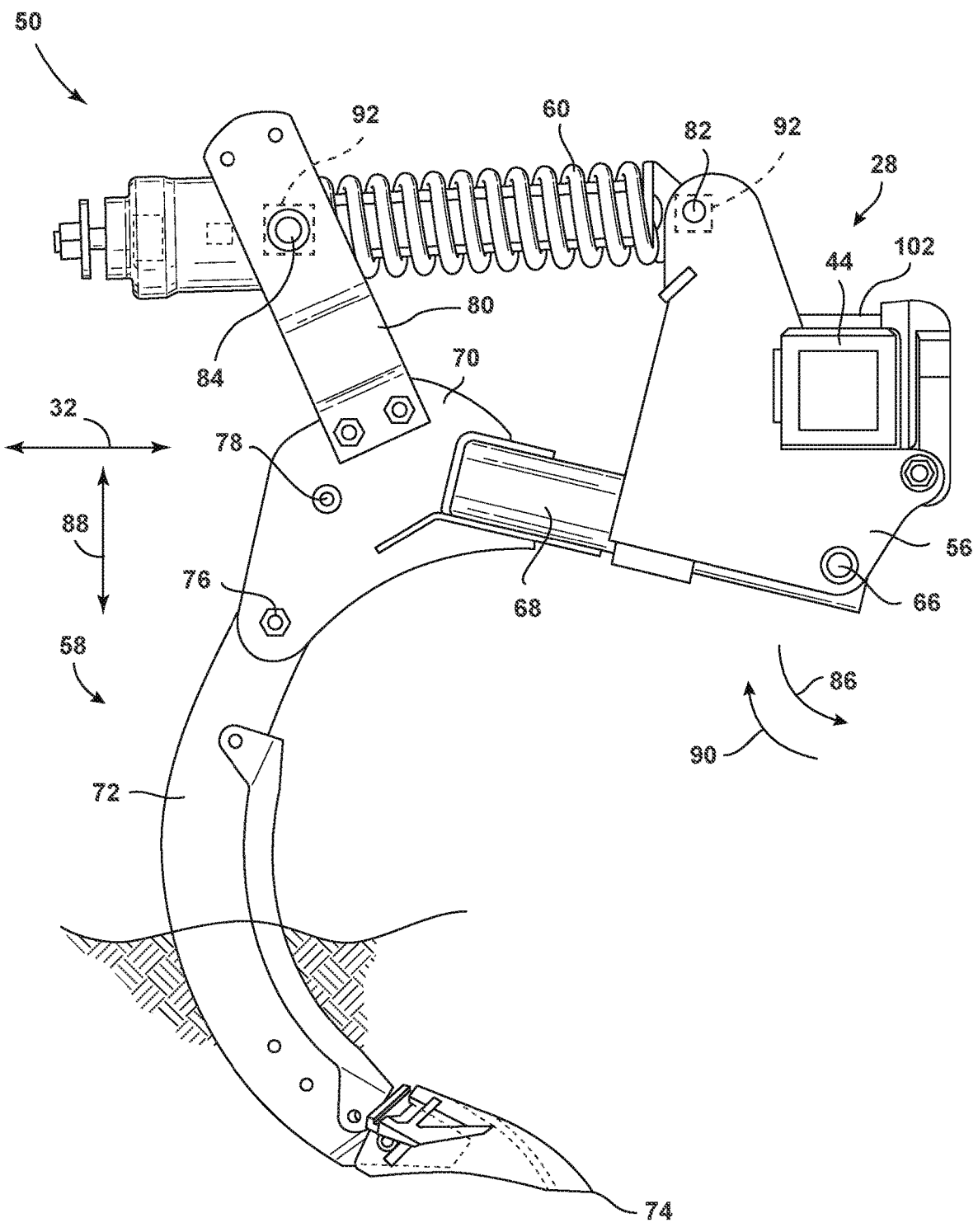
FIG. 2 illustrates a side view of one embodiment of a shank assembly of an agricultural implement in accordance with aspects of the present subject matter.

FIG. 2 illustrates a side view of one of the shank assemblies 50. As shown, the shank assembly 50 includes an attachment section 56, a ground-engaging shank 58, and a biasing element 60. Furthermore, the ground-engaging shank 58 is pivotably coupled to the attachment section 56 at a pivot joint 66. Additionally, the biasing element 60 is coupled between the attachment section 56 and the ground-engaging shank 58. As will be described below, the biasing element 60 is configured to apply a biasing load to the ground-engaging shank 58. In this respect, as the agricultural implement 10 travels across the field to perform an agricultural operation, the biasing load pushes the ground-engaging shank 58 into the soil.

In the illustrated embodiment, the ground-engaging shank 58 includes a first portion 68, a second portion 70, and a third portion 72. More specifically, the first portion 68 of the ground-engaging shank 58 is pivotably coupled to the attachment section 56 of the shank assembly 50 at the pivot joint 66. Additionally, the second portion 70 of the ground-engaging shank 58 is fixedly coupled to the first portion 68 of the ground-engaging shank 58. Moreover, the third portion 72 of the ground-engaging shank 58 is coupled to the second portion 70 of the ground-engaging shank 58 via a pivot joint 76 and a shear pin 78. The third portion 72 of the ground-engaging shank 58 is the portion of the ground-engaging shank 58 that is configured to penetrate into the soil during agricultural operations. As such, the third portion 72 of the ground-engaging shank 58 terminates at a tip 74. In addition, the ground-engaging shank 58 includes an arm 80 extending outward from the second portion 70 of the ground-engaging shank 58 such that the arm 80 couples to the biasing element 60. However, in alternative embodiments, the ground-engaging shank 58 may have any other suitable configuration.

Furthermore, as mentioned above, the biasing element 60 is configured to exert a biasing load on the ground-engaging shank 58. As such, in the illustrated embodiment, the biasing element 60 is configured as a coil spring coupled to the attachment section 56 at a first pivot joint 82 and the arm 80 of the ground-engaging shank 58 at a second pivot joint 84. However, in alternative embodiments, the biasing element 60 may be configured as any other suitable device or structure configured to exert a biasing load on the ground-engaging shank 58. For example, in one alternative embodiment, the biasing element 60 may be configured as a pneumatic or hydraulic cylinder.

During an agricultural operation (e.g., a tillage operation), the ground-engaging shank 58 is pulled through the soil as the agricultural implement 10 is towed across the field. In general, the biasing element 60 bias the ground-engaging shank 58 to a predetermined tool position relative to the frame 28. More specifically, the biasing element 60 applies a biasing load to the ground-engaging shank 58 to pivot (e.g., as indicated by arrow 86) downward in a vertical direction 88. As such, the biasing load causes the tip 74 of the ground-engaging shank 58 to penetrate into the soil to a selected or desired penetration depth when at the predetermined tool position. When the ground-engaging shank 58 contacts a rock, culvert, foundation, or other buried obstacle, the force of such contact may overcome the biasing load. In such instances, the biasing element 60 allows the ground-engaging shank 58 to pivot (e.g., as indicated by arrow 90) upward in the vertical direction 88 such that the ground-engaging shank 58 moves out of the way of the buried obstacle. Such upward pivoting of the ground-engaging shank 58 for a shortened time period is known as tripping.

Moreover, in some instances, the ground-engaging shank 58 may contact firm or compacted soil in certain portions of the field that may exert a sufficient force on the ground-engaging shank 58 to overcome the biasing load of the biasing element 60. In this respect, the ground-engaging shank 58 may pivot (e.g., as indicated by arrow 90) upward in the vertical direction 88 relative to the frame 28 such that the ground-engaging shank 58 is displaced from the predetermined tool position to which it is biased for an extended period of time (e.g., three or more seconds). This is known as floating.

It should be further appreciated that the configuration of the agricultural implement 10 and the work vehicle 12 described above and shown in FIGS. 1-2 is provided only to place the present subject matter in an exemplary field of use. Thus, it should be appreciated that the present subject matter may be readily adaptable to any manner of agricultural implement and/or work vehicle configuration.

Additionally, as shown in FIG. 2, the shank assembly 50 of the agricultural implement 10 includes one or more load sensors 92. More specifically, each load sensor 92 is in operative association with one of the first pivot joint 82 or the second pivot joint 84. As such, each load sensor 92 is configured to generate data indicative of a load being applied to the corresponding first pivot joint 82 or the second pivot joint 84 by the ground-engaging shank 58. As will be described below, the data generated by the load sensor(s) 92 is used to determine when the ground-engaging shank 58 is tripping and/or floating.

The load sensor 92 may be configured as any suitable sensor or sensing device configured to generate data indicative of the loads being applied to or otherwise acting on corresponding first pivot joint 82 or the second pivot joint 84. For example, in some embodiments, each load sensor 92 is configured as a load pin. However, in alternative embodiments, each load sensor 92 may be configured as any other suitable type of sensor or sensing device such as a multi-axial load cell, strain gauge, etc.

Additionally, in the illustrated embodiment, the shank assembly 50 includes a pair of load sensors 92. That is, in the illustrated embodiment, the shank assembly 50 includes one load sensor 92 in operative association with the first pivot joint 82 and another load sensor 92 in operative association with the second pivot joint 84. However, in other embodiments, the shank assembly 50 may include only a single load sensor 92. For example, in one embodiment, the shank assembly 50 may include a single load sensor 92 in operative association with the first pivot joint 82. Moreover, in another one embodiment, the shank assembly 50 may include a single load sensor 92 in operative association with the second pivot joint 84.

Figure 3:
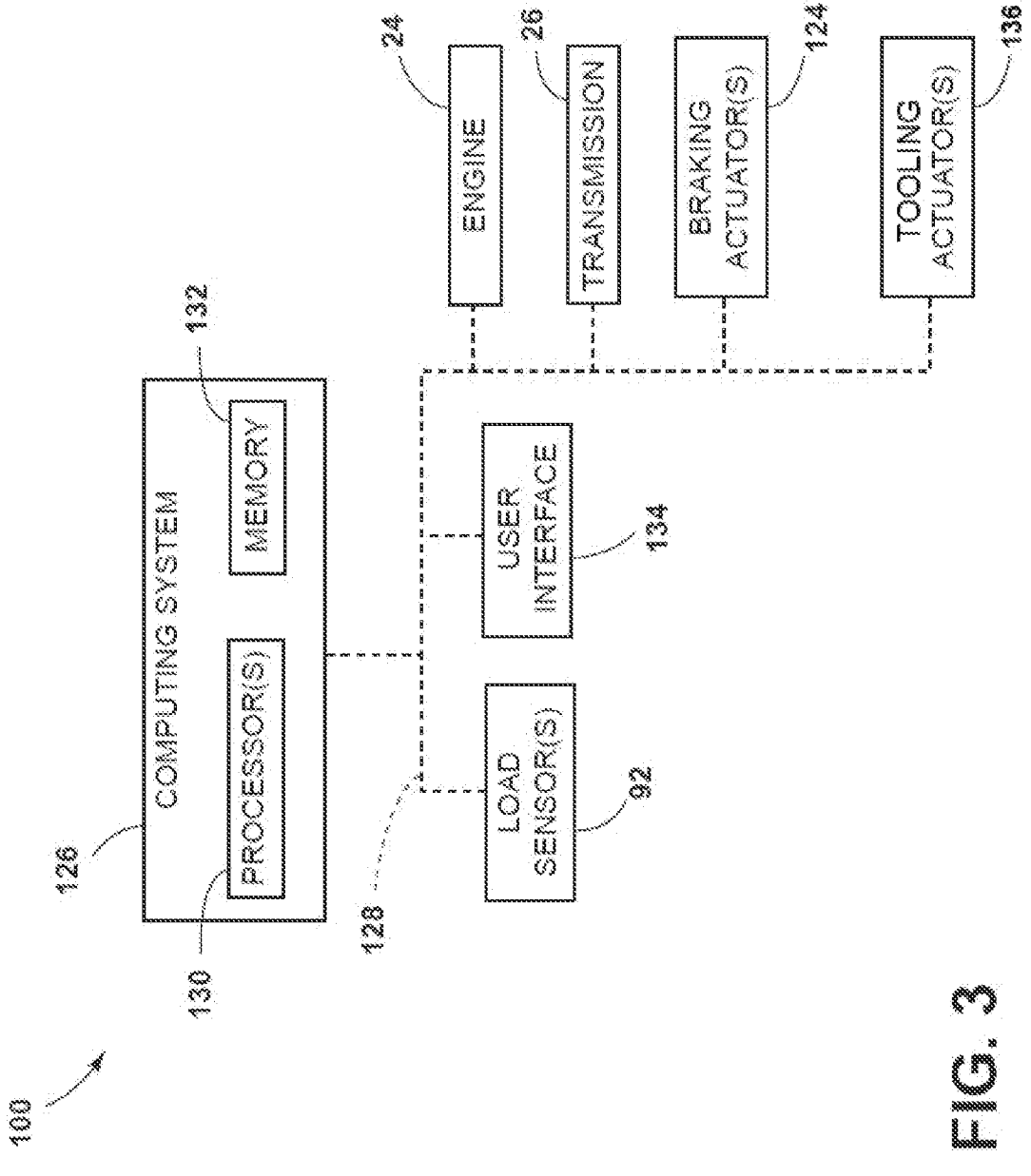
FIG. 3 illustrates a schematic view of one embodiment of a system for detecting tripping and/or floating of ground-engaging shanks on an agricultural implement in accordance with aspects of the present subject matter.

Referring now to FIG. 3, a schematic view of one embodiment of a system 100 for detecting tripping and/or floating for ground-engaging shanks 58 on an agricultural implement is illustrated in accordance with aspects of the present subject matter. In general, the system 100 will be described herein with reference to the agricultural implement 10 and the work vehicle 12 described above with reference to FIGS. 1-2. However, it should be appreciated by those of ordinary skill in the art that the disclosed system 100 may generally be utilized with agricultural implements having any other suitable implement configuration and/or work vehicles having any other suitable vehicle configuration.

As shown in FIG. 3, the system 100 includes one or more components of the agricultural implement 10 and/or the work vehicle 12. For example, in the illustrated embodiment, the system 100 includes the engine 24, the transmission 26, and the load sensor(s) 92.

Additionally, the system 100 may include one or more braking actuators 124 of the work vehicle 12. In general, when activated, the braking actuator(s) 124 may reduce the speed at which the work vehicle 12 moves across the field, such as by converting energy associated with the movement of the work vehicle 12 into heat. For example, in one embodiment, the braking actuator(s) 124 may correspond to a suitable hydraulic cylinder(s) configured to push a stationary frictional element(s) (not shown), such as a brake shoe(s) or a brake caliper(s), against a rotating element(s) (not shown), such as a brake drum(s) or a brake disc(s). However, in alternative embodiments, the braking actuator(s) 124 may any other suitable hydraulic, pneumatic, mechanical, and/or electrical component(s) configured to convert the rotation of the rotating element(s) into heat. In addition, in embodiments in which speed control can be actuated by the throttle body position, the braking actuator(s) 124 may be omitted.

Furthermore, the system 100 may include one or more tooling actuators 136 of the agricultural implement 10. In general, when activated, the tooling actuator(s) 136 may reduce the depth of tillage at which the agricultural implement 10 is engaged, such as by increasing the distance between the various gangs 46 of disk blades 48 and the ground, the plurality of shank assemblies 50 and the ground, the plurality of leveling blades 52 and the ground, the plurality of crumbler wheels or basket assemblies 54 and the ground, and/or any other suitable ground-engaging tool(s), ground-penetrating tool(s), or combinations of such tools and the ground.

Moreover, the system 100 includes a computing system 126 communicatively coupled to one or more components of the agricultural implement 10, the work vehicle 12, and/or the system 100 to allow the operation of such components to be electronically or automatically controlled by the computing system 126. For instance, the computing system 126 may be communicatively coupled to the load sensor(s) 92 via a communicative link 128. As such, the computing system 126 may be configured to receive data from the load sensor(s) 92 that is indicative of the load(s) being applied to the first pivot joint(s) 82 coupling the biasing element(s) 60 to the frame 28 and/or the second pivot joint(s) 84 coupling the biasing element(s) 60 to the ground-engaging shank(s) 58. Furthermore, the computing system 126 may be communicatively coupled to the engine 24, the transmission 26, and/or the braking actuator(s) 124 via the communicative link 128. In this respect, the computing system 126 may be configured to control the operation of the engine 24, the transmission 26, and/or the braking actuator(s) 124 to adjust the ground speed at which the agricultural implement 10 travels across the field. Additionally, the computing system 126 may be communicatively coupled to the tooling actuator(s) 136 via the communicative link 128. In this respect, the computing system 126 may be configured to control the operation of the tooling actuator(s) 136 to reduce the depth of tillage at which the agricultural implement 10 is engaged. In addition, the computing system 126 may be communicatively coupled to any other suitable components of the agricultural implement 10, the work vehicle 12, and/or the system 100.

In general, the computing system 126 may comprise one or more processor-based devices, such as a given controller or computing device or any suitable combination of controllers or computing devices. Thus, in several embodiments, the computing system 126 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 132 of the computing system 126 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 132 may generally be configured to store suitable computer-readable instructions that, when implemented by the processor(s) 130, configure the computing system 126 to perform various computer-implemented functions, such as one or more aspects of the methods and algorithms that will be described herein. In addition, the computing system 126 may also include various other suitable components, such as a communications circuit or module, one or more input/output channels, a data/control bus and/or the like.

The various functions of the computing system 126 may be performed by a single processor-based device or may be distributed across any number of processor-based devices, in which instance such devices may be considered to form part of the computing system 126. For instance, the functions of the computing system 126 may be distributed across multiple application-specific controllers or computing devices, such as a navigation controller, an engine controller, a transmission controller, an implement controller, and/or the like.

In addition, the system 100 may also include a user interface 134. More specifically, the user interface 134 may be configured to provide feedback from the computing system 126 (e.g., feedback associated with tripping and/or floating of the ground-engaging shank(s) 58) to the operator. As such, the user interface 134 may include one or more feedback devices (not shown), such as display screens, speakers, warning lights, and/or the like, which are configured to provide feedback from the computing system 126 to the operator. As such, the user interface 134 may, in turn, be communicatively coupled to the computing system 126 via the communicative link 128 to permit the feedback to be transmitted from the computing system 126 to the user interface 134. Furthermore, some embodiments of the user interface 134 may include one or more input devices, such as touchscreens, keypads, touchpads, knobs, buttons, sliders, switches, mice, microphones, and/or the like, which are configured to receive inputs from the operator. In one embodiment, the user interface 134 may be mounted or otherwise positioned within the operator's cab 22 of the work vehicle 12. However, in alternative embodiments, the user interface 134 may mounted at any other suitable location.

Figure 4:
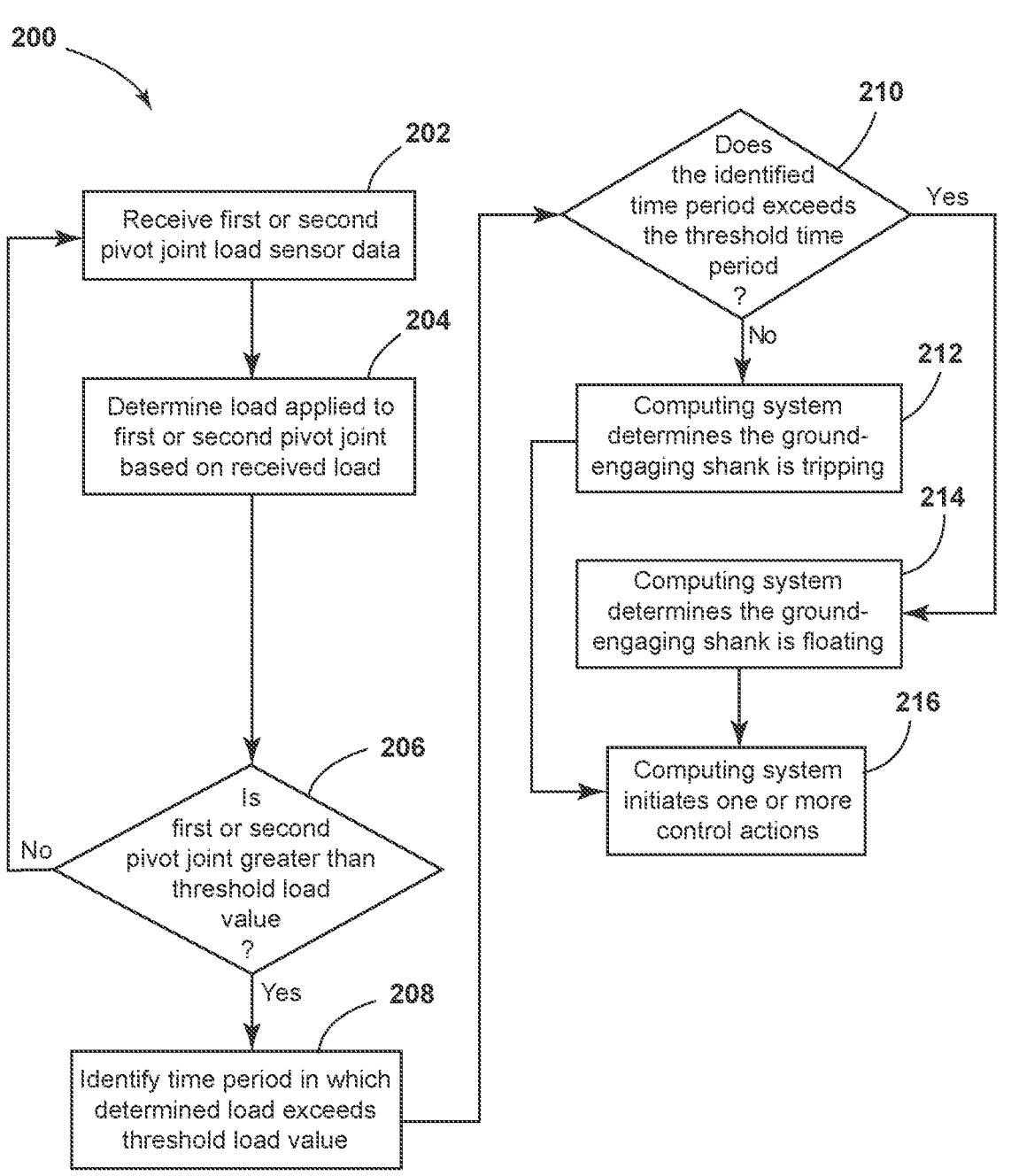
FIG. 4 illustrates a flow diagram providing one embodiment of control logic for detecting tripping and/or floating of ground-engaging shanks on an agricultural implement in accordance with aspects of the present subject matter.

Referring now to FIG. 4, a flow diagram of one embodiment of example control logic 200 that may be executed by the computing system 126 (or any other suitable computing system) for detecting tripping and/or floating of ground-engaging shanks on an agricultural implement is illustrated in accordance with aspects of the present subject matter. Specifically, the control logic 200 shown in FIG. 4 is representative of steps of one embodiment of an algorithm that can be executed to automatically detect tripping and/or floating of the ground-engaging shanks on an agricultural implement in real-time and without requiring substantial computing resources and/or processing time. However, in other embodiments, the control logic 200 may be used in association with any other suitable system, application, and/or the like for detecting tripping and/or floating of ground-engaging shanks on an agricultural implement.

As shown, at (202), the control logic 200 includes receiving load sensor data indicative of the load being applied to one of a first pivot joint or a second pivot joint of an agricultural implement. Specifically, as mentioned above, in several embodiments, the computing system 126 may be communicatively coupled to the load sensor(s) 92 via the communicative link 128. In this respect, as the agricultural implement 10 is towed across the field by the work vehicle 12 to perform an agricultural operation (e.g., a tillage operation) thereon, the computing system 126 may receive load sensor data from the load sensor(s) 92. Such load sensor data may, in turn, be indicative of the load(s) being applied to the first pivot joint(s) 82 and/or the second pivot joint(s) 84 of the agricultural implement 10 by the corresponding ground-engaging shank(s) 58. For example, as mentioned above, in one embodiment, the load sensor(s) 92 is operative association with the first pivot joint(s) 82 of the agricultural implement 10. In such embodiments, the load sensor data received at (202) is indicative of the load(s) being applied to the first pivot joint(s) 82 of the agricultural implement 10. In another embodiment, the load sensor(s) 92 is operative association with the second pivot joint(s) 84 of the agricultural implement 10. In such embodiments, the load sensor data received at (202) is indicative of the load(s) being applied to the second pivot joint(s) 84 of the agricultural implement 10.

Additionally, at (204), the control logic 200 includes determining the load being applied to the first pivot joint or the second pivot joint based on the received load sensor data. Specifically, in several embodiments, the computing system 126 is configured to analyze the load sensor data received at (202) to determine the load(s) acting on the first pivot joint(s) 82 and/or the second pivot joints(s) 84. For instance, the computing system 126 may include a look-up table, suitable mathematical formula, and/or algorithms stored within its memory device(s) 132 that correlates the received load sensor data to the load(s) being applied to the first pivot joint(s) 82 and/or the second pivot joints(s) 84.

Moreover, at (206), the control logic 200 includes comparing the determined load to a threshold load value. More specifically, the loads being applied to a given set of the first and second pivot joints 82, 84 generally increase linearly as the biasing element 60 is compressed. In this respect, in several embodiments, the computing system 126 is configured to compare the load(s) determined at (204) to a threshold load value. When the load(s) being applied to a given first or second pivot 82, 84 joint is equal to or less than the threshold load value, the corresponding ground-engaging shank 58 is not tripping or floating. In such instances, the control logic 200 (with respect to that ground-engaging shank 58) returns to (202). Conversely, when the load(s) being applied to a given first or second pivot joint 82, 84 exceeds the threshold value, the corresponding ground-engaging shank 58 is tripping or floating. In such instances, the control logic 200 (with respect to that ground-engaging shank 58) proceeds to (208).

Furthermore, at (208), the control logic 200 includes identifying a time period across which the determined load exceeds the threshold load value. Specifically, in several embodiments, the computing system 126 is configured to identify or otherwise determine the time period(s) across the load(s) determined at (204) exceeds the threshold load value. As will be described below, the time period(s) identified at (208) is used to determine whether the ground-engaging shank(s) 58 is tripping or floating.

Additionally, at (210), the control logic 200 includes comparing the identified time period to a threshold time period. More specifically, as described above, when a ground-engaging shank 58 pivots upward relative to the frame 28 for a short period of time (e.g., less than two seconds), the ground-engaging shank 58 is tripping. Conversely, when a ground-engaging shank 58 pivots upward relative to the frame 28 for an extended period of time (e.g., more than two seconds), the ground-engaging shank 58 is floating. As such, in several embodiments, the computing system 126 is configured to compare the time period(s) identified at (208) to a threshold time period. When the identified time period(s) is equal to or less than the threshold time period, the corresponding ground-engaging shank(s) 58 is tripping. In such instances, the control logic 200 (with respect to that ground-engaging shank 58) proceeds to (212) at which the computing system 126 determines that the corresponding ground-engaging shank(s) 58 is tripping. Conversely, when the identified time period(s) exceeds the threshold time period, the corresponding ground-engaging shank(s) 58 is floating. In such instances, the control logic 200 (with respect to that ground-engaging shank 58) proceeds to (214) at which the computing system 126 determines that the corresponding ground-engaging shank(s) 58 is floating. After (212) or (214), the control logic 200 proceeds to (216).

Moreover, at (216), the control logic 200 includes initiating a control action. Specifically, in several embodiments, after it is determined at (212) or (214) that one or more of the ground-engaging shanks 58 of the agricultural implement 10 are tripping or floating, the computing system 126 may be configured to initiate one or more control actions. For example, in some embodiments, the computing system 126 may be configured to initiate notification of the operator of the agricultural implement 10 that the one or more of the ground-engaging shanks 58 are experiencing tripping and/or floating. In such embodiments, the computing system 126 may transmit control signals to the user interface 134 via the communicative link 128. Such control signals may, in turn, instruct the user interface 134 to provide a visual or audible notification to the operator that one or more of the ground-engaging shanks 58 are tripping or floating. In one embodiment, the notification may indicate which ground-engaging shank(s) 58 are tripping or floating.

Additionally, or alternatively, after it is determined at (212) or (214) that one or more of the ground-engaging shanks 58 of the agricultural implement 10 are experiencing tripping and/or floating, the control action(s) may include adjusting the ground speed of the agricultural implement 10 and/or reducing the depth of tillage of the agricultural implement 10. Specifically, in some embodiments, the computing system 126 may be configured to initiate an adjustment to the ground speed of the agricultural implement 10 (e.g., reduce the ground speed of or stop the agricultural implement 10) and/or reduce the depth of tillage of the agricultural implement 10. For example, the computing system 126 may transmit control signals to the engine 24, the transmission 26, and/or the braking actuator(s) 124 via the communicative link 128. Such control signals may, in turn, instruct the engine 24, the transmission 26, and/or the braking actuator(s) 124 to adjust the ground speed of the work vehicle 12 and, thus, the agricultural implement 10 (e.g., reduce the ground speed of or stop the agricultural implement 10). As another example, the computing system 126 may transmit control signals to the tooling actuator(s) 136 via the communicative link 128. Such control signals, may, in turn, instruct the tooling actuator(s) 136 to reduce the depth of tillage of the agricultural implement 10. Moreover, other automatic control actions (e.g., adjusting force being applied to and/or the penetration depth of the ground-engaging shank(s) 58) may be initiated after it is determined that one or more of the ground-engaging shank(s) 58 are tripping or floating.

Figure 5:
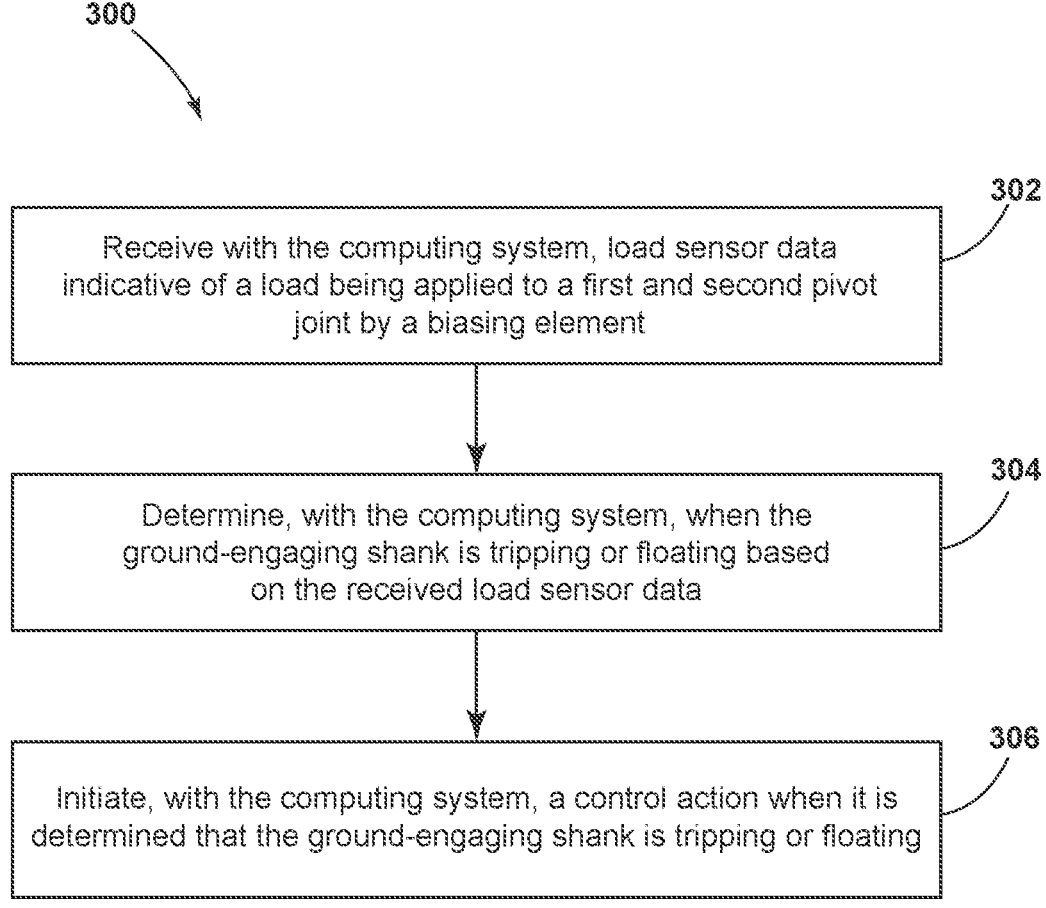
FIG. 5 illustrates a flow diagram of one embodiment of a method for detecting tripping and/or floating of ground-engaging shanks on an agricultural implement in accordance with aspects of the present subject matter.

Referring now to FIG. 5, a flow diagram of one embodiment of a method 300 for detecting tripping and/or floating of ground-engaging shanks on an agricultural implement is illustrated in accordance with aspects of the present subject matter. In general, the method 300 will be described herein with reference to the agricultural implement 10, the work vehicle 12, and the system 100 described above with reference to FIGS. 1-4. However, it should be appreciated by those of ordinary skill in the art that the disclosed method 300 may generally be implemented with any agricultural implement having any suitable implement configuration, with any work vehicle having any suitable vehicle configuration, and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 includes receiving, with a computing system, load sensor data indicative of a load being applied to one of a first pivot joint or a second pivot joint by aground-engaging shank. For instance, as described above, the computing system 126 may be configured to receive load sensor data from the load sensor(s) 92 via the communicative link 128. The received load sensor data is, in turn, indicative of the load(s) being applied to the first pivot joint(s) 82 and/or the second pivot joint(s) 84 by the ground-engaging shank(s) 58.

Additionally, at (304), the method 300 includes determining, with the computing system, when the ground-engaging shank is tripping or floating based on the received load sensor data. For instance, as described above, the computing system 126 is configured to determine when the ground-engaging shank(s) 58 is tripping or floating based on the received load sensor data.

Moreover, at (306), the method 300 includes initiating, with the computing system, a control action when it is determined that the ground-engaging shank is tripping or floating. For instance, as described above, the computing system 126 may be configured to initiate one or more control actions when it is determined that one or more of the ground-engaging shank(s) 58 are tripping and/or floating. Such control action(s) may include providing a notification to the operator, adjusting the ground speed of the agricultural implement 10, reducing the depth of tillage of the agricultural implement 10, and/or the like.

It is to be understood that the steps of the control logic 200 and the method 300 are performed by the computing system 126 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 126 described herein, such as the control logic 200 and the method 300, is implemented in software code or instructions which are tangibly stored on a tangible computer readable medium. The computing system 126 loads the software code or instructions via a direct interface with the computer readable medium or via a wired and/or wireless network. Upon loading and executing such software code or instructions by the computing system 126, the computing system 126 may perform any of the functionality of the computing system 126 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:

a frame;

a ground-engaging shank pivotably coupled to the frame;

a coil spring coupled to the frame at a first pivot joint and to the ground-engaging shank at a second pivot joint, the coil spring configured to bias the ground-engaging shank to a predetermined tool position relative to the frame;

a load sensor in operative association with at least one of the first pivot joint or the second pivot joint, the load sensor configured to generate load data of a load being applied at the first pivot joint or the second pivot joint by the coil spring; and a computing system communicatively coupled to the load sensor, the computing system configured to:

determine the load being applied at the first pivot joint or the second pivot joint based on the load data generated by the load sensor, the determined load indicative of a compression load of the coil spring being compressed between the first pivot joint and the second pivot joint; and determine when the ground-engaging shank is tripping or floating based on the determined load.

2. The agricultural implement of claim 1, wherein the load sensor is in operative association with the first pivot joint such that the load sensor generates load data of the load being applied at the first pivot joint.

3. The agricultural implement of claim 1, wherein the load sensor is in operative association with the second pivot joint such that the load sensor generates load data of the load being applied at the second pivot joint.

4. The agricultural implement of claim 1, wherein, when determining when the ground-engaging shank is tripping or floating, the computing system is further configured to:

compare the determined load to a threshold load value; and determine that the ground-engaging shank is tripping or floating when the determined load exceeds the threshold load value.

5. The agricultural implement of claim 1, wherein, when determining when the ground-engaging shank is tripping or floating, the computing system is further configured to:

compare the determined load to a threshold load value;

identify a time period across which the determined load exceeds the threshold load value;

compare the identified time period to a threshold time period; and determine that the ground-engaging shank is tripping when the identified time period is equal to or less than the threshold time period.

6. The agricultural implement of claim 1, wherein, when determining when the ground-engaging shank is tripping or floating, the computing system is further configured to:

compare the determined load to a threshold load value;

identify a time period across which the determined load exceeds the threshold load value;

compare the identified time period to a threshold time period; and determine that the ground-engaging shank is floating when the identified time period exceeds threshold time period.

7. A system for detecting tripping or floating of ground-engaging shanks on an agricultural implement, the system comprising:

a ground-engaging shank pivotably coupled to a frame of the agricultural implement;

a coil spring coupled to the frame at a first pivot joint and to the ground-engaging shank at a second pivot joint, the coil spring configured to bias the ground-engaging shank to a predetermined tool position relative to the frame;

a load sensor in operative association with at least one of the first pivot joint or the second pivot joint, the load sensor configured to generate load data of a load being applied at the first pivot joint or the second pivot joint by the coil spring; and a computing system communicatively coupled to the load sensor, the computing system configured to:

determine the load being applied at the first pivot joint or the second pivot joint based on the load data generated by the load sensor, the determined load indicative of a compression load of the coil spring being compressed between the first pivot joint and the second pivot joint; and determine when the ground-engaging shank is tripping or floating based on the determined load.

8. The system of claim 7, wherein the load sensor is in operative association with the first pivot joint such that the load sensor generates load data of the load of the being applied at the first pivot joint.

9. The system of claim 7, wherein the load sensor is in operative association with the second pivot joint such that the load sensor generates load data of the load being applied at the second pivot joint.

10. The system of claim 7, wherein, when determining when the ground-engaging shank is tripping or floating, the computing system is further configured to:

compare the determined load to a threshold load value;

identify a time period across which the determined load exceeds the threshold load value;

compare the identified time period to a threshold time period; and determine that the ground-engaging shank is tripping when the identified time period is equal to or less than the threshold time period.

11. The system of claim 7, wherein, when determining when the ground-engaging shank is tripping or floating, the computing system is further configured to:

compare the determined load to a threshold load value;

identify a time period across which the determined load exceeds the threshold load value;

compare the identified time period to a threshold time period; and determined that the ground-engaging shank is floating when the identified time period exceeds the threshold time period.

12. The system of claim 7, wherein, when it is determined that the ground-engaging shank is tripping or floating, the computing system is further configured to initiate a control action.

13. The system of claim 12, wherein the control action comprises notifying an operator of the agricultural implement that the ground-engaging shank is tripping or floating.

14. The system of claim 12, wherein the control action comprises at least one of adjusting a ground speed of the agricultural implement or reducing the depth of tillage of the agricultural implement.

15. The system of claim 7, wherein the computing system is further configured to generate a field map identifying one or more locations within a field across which the agricultural implement is traveling that the ground-engaging shank has tripped or floated.

16. A method for detecting tripping or floating of ground-engaging shanks on an agricultural implement, the agricultural implement including a frame, a ground-engaging shank pivotably coupled to the frame, and a coil spring coupled to the frame at a first pivot joint and to the ground-engaging shank at a second pivot joint, the method comprising:

receiving, with a computing system, load sensor data of a load being applied at the first pivot joint or the second pivot joint by the coil spring;

determining, with the computing system, the load being applied at the first pivot joint or the second pivot joint based on the received load sensor data, the determined load indicative of a compression load of the coil spring being compressed between the first pivot joint and the second pivot joint;

determining, with the computing system, when the ground-engaging shank is tripping or floating based on the determined load; and initiating, with the computing system, a control action when it is determined that the ground-engaging shank is tripping or floating.

17. The method of claim 16, wherein determining when the ground-engaging shank is tripping or floating comprises:

comparing, with the computing system, the determined load to a threshold load value;

identifying, with the computing system, a time period across which the determined load exceeds the threshold load value;

comparing, with the computing system, the identified time period to a threshold time period; and determining, with the computing system, that the ground-engaging shank is tripping when the identified time period is equal to or less than the threshold time period.

18. The method of claim 16, wherein determining when the ground-engaging shank is tripping or floating comprises:

comparing, with the computing system, the determined load to a threshold load value;

identifying, with the computing system, a time period across which the determined load exceeds the threshold load value;

comparing, with the computing system, the identified time period to a threshold time period; and determining, with the computing system, that the ground-engaging shank is floating when the identified time period exceeds the threshold time period.

19. The method of claim 16, wherein the control action comprises notifying an operator of the agricultural implement that the ground-engaging shank is tripping or floating.

20. The method of claim 16, wherein the control action comprises at least one of adjusting a ground speed of the agricultural implement or reducing the depth of tillage of the agricultural implement.

* * * * *